United States Patent
Peng et al.

(10) Patent No.: US 10,389,962 B2
(45) Date of Patent: Aug. 20, 2019

(54) IMAGE PICKUP APPARATUS AND METHOD UTILIZING THE SAME LINE RATE FOR UPSCALING AND OUTPUTTING IMAGE

(71) Applicant: Himax Imaging Limited, Tainan (TW)

(72) Inventors: Yuan-Chih Peng, Tainan (TW); Ching-Fong Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 33 days.

(21) Appl. No.: 15/675,803

(22) Filed: Aug. 14, 2017

(65) Prior Publication Data
US 2019/0052829 A1   Feb. 14, 2019

(51) Int. Cl.
| | |
|---|---|
| H04N 5/376 | (2011.01) |
| G06T 3/40 | (2006.01) |
| H04N 5/262 | (2006.01) |
| H04N 5/232 | (2006.01) |
| H04N 5/345 | (2011.01) |
| H04N 5/374 | (2011.01) |
| H04N 5/361 | (2011.01) |

(52) U.S. Cl.
CPC ......... *H04N 5/3765* (2013.01); *G06T 3/4053* (2013.01); *H04N 5/23296* (2013.01); *H04N 5/2628* (2013.01); *H04N 5/3454* (2013.01); *H04N 5/361* (2013.01); *H04N 5/376* (2013.01); *H04N 5/374* (2013.01)

(58) Field of Classification Search
None
See application file for complete search history.

(56) References Cited

U.S. PATENT DOCUMENTS

| | | | |
|---|---|---|---|
| 5,253,064 A * | 10/1993 | Yamamoto | G06T 3/4007 348/240.2 |
| 6,144,408 A | 11/2000 | MacLean | |
| 6,339,434 B1 | 1/2002 | West | |
| 6,727,947 B1 * | 4/2004 | Kobayashi | H04N 5/2628 348/240.2 |
| 7,257,278 B2 | 8/2007 | Burks | |
| 7,508,426 B2 * | 3/2009 | Kawaguchi | H04N 5/2178 348/240.1 |
| 2005/0253938 A1 * | 11/2005 | Kawaguchi | H04N 5/2628 348/240.1 |
| 2007/0071360 A1 * | 3/2007 | Kuroki | G06T 3/4007 382/298 |

(Continued)

*Primary Examiner* — Sinh Tran
*Assistant Examiner* — Quan Pham
(74) *Attorney, Agent, or Firm* — Winston Hsu (57) ABSTRACT

An image pickup apparatus includes an image sensor array, a scaling circuit, an output circuit and a timing control circuit. The image sensor array reads N pixel lines according to a read timing control signal to capture N lines of pixel data of a source image. The scaling circuit receives the N lines of pixel data according to a scaling timing control signal, and refers to a scaling factor to scale up the source image to generate an upscaled image having M lines of pixel data. M is a positive integer greater than N. The output circuit outputs the M lines of pixel data according to an output timing. The timing control circuit determines a receiving timing according to the output timing and the scaling factor to generate the scaling timing control signal, and determines a read timing according to the receiving timing to generate the read timing control signal.

18 Claims, 8 Drawing Sheets

(56) References Cited

U.S. PATENT DOCUMENTS

2007/0211153 A1\* 9/2007 Uchida .............. H04N 5/23293
                                                    348/231.99
2016/0044221 A1\* 2/2016 Shiohara ................ H04N 5/238
                                                       348/360
2016/0198095 A1\* 7/2016 Lee ................... H01L 27/14618
                                                      348/240.2

\* cited by examiner

| Output line | X | $LZ_1$ | $LZ_2$ | $LZ_3$ | $LZ_4$ | $LZ_5$ | $LZ_6$ | $LZ_7$ | $LZ_8$ | ... |
|---|---|---|---|---|---|---|---|---|---|---|
| ACC | 1/2 | 3/10 | 1/10 | 9/10 | 7/10 | 5/10 | 3/10 | 1/10 | 9/10 | ... |
| CAV | 0 | 1 | 1 | 0 | 1 | 1 | 1 | 1 | 0 | ... |
| Input line | X | $LS_1$ | $LS_2$ | $LS_2$ | $LS_3$ | $LS_4$ | $LS_5$ | $LS_6$ | $LS_6$ | ... |

IMAGE PICKUP APPARATUS AND METHOD UTILIZING THE SAME LINE RATE FOR UPSCALING AND OUTPUTTING IMAGE

BACKGROUND OF THE INVENTION

1. Field of the Invention

The disclosed embodiments of the present invention relate to image upscaling, and more particularly, to an image pickup apparatus utilizing the same line rate for upscaling and outputting an image, and a related image pickup method.

2. Description of the Prior Art

A conventional CMOS imaging apparatus employs a rolling shutter technique to scan an image line by line (or row by row) to capture image information. When performing zoom operations, the conventional CMOS imaging apparatus requires additional storage space. For example, when scaling up a source image having 240 lines of pixel data to generate an upscaled image fitting a full size of a screen (having 480 lines of pixel data), the conventional CMOS imaging apparatus firstly reads out the 240 lines of pixel data from an image sensor array at a line rate, processing the 240 lines of pixel data to generate the 480 lines of pixel data, and outputs the generated 480 lines of pixel data at the same line rate. However, when all of the 240 lines of pixel data are read out from the image sensor array, only half the generated 480 lines of pixel data are outputted to a display device. Hence, the conventional CMOS imaging apparatus has to provide a line buffer to store lines of pixel data which have not been outputted to the display device. The manufacturing costs are increased accordingly.

Another conventional image upscaling method is to read image data from an image sensor array at a reduced line rate. For example, in order to generate an upscaled image having twice the number of lines of pixel data of a source image, a conventional CMOS imaging apparatus operates an image sensor array at half a line rate at which lines of pixel data are outputted to a display device. However, a shorter or longer line of pixel data has to be inserted into a frame read out from the image sensor array because of limited available clocks and frame synchronization requirements, which results in uneven exposures. Additionally, as on-the-fly zoom-in and pan operations require instantaneous changes in the clock frequency, certain frames cannot normally be displayed.

Thus, there is a need for a novel image pickup mechanism to provide good image quality in various zoom scenarios without the use of additional storage space.

SUMMARY OF THE INVENTION

In accordance with exemplary embodiments of the present invention, an image pickup apparatus utilizing the same line rate for upscaling and outputting an image, and a related image pickup method are proposed to solve the above-mentioned problems.

According to an embodiment of the present invention, an exemplary image pickup apparatus is disclosed. The exemplary image pickup apparatus comprises an image sensor array, a scaling circuit, an output circuit and a timing control circuit. The image sensor array has a plurality of pixel lines, and is arranged for reading N of the pixel lines one at a time according to a read timing control signal so as to capture N lines of pixel data of a source image, wherein N is a positive integer. The scaling circuit is coupled to the image sensor array, and is arranged for receiving a scaling timing control signal, receiving the N lines of pixel data of the source image one at a time according to the scaling timing control signal, and referring to a scaling factor to scaleup the source image to generate an upscaled image having M lines of pixel data, wherein M is a positive integer greater than N. The output circuit is coupled to the scaling circuit, and is arranged for outputting the M lines of pixel data of the upscaled image one at a time according to an output timing control signal. The timing control circuit is coupled to the output circuit, the scaling circuit and the image sensor array, and is arranged for generating the output timing control signal according to an output timing, determining a receiving timing of the N lines of pixel data according to the output timing and the scaling factor and accordingly generating the scaling timing control signal, and determining a read timing of the N pixel lines according to the receiving timing and accordingly generating the read timing control signal.

According to an embodiment of the present invention, an exemplary image pickup method for image upscaling is disclosed. The exemplary image pickup method comprises the following steps: referring to an output timing and a scaling factor between a source image and an upscaled image to determine a receiving timing of N lines of pixel data of the source image received utilizing a scaling circuit, wherein the upscaled image comprises M lines of pixel data, the M lines of pixel data are outputted one at a time according to the output timing, N is a positive integer, and M is a positive integer greater than N; determining a read timing of N pixel lines of a plurality of pixel lines of an image sensor array according to the receiving timing; generating a read timing control signal according to the read timing, and reading the N pixel lines one at a time according to the read timing control signal so as to capture the N lines of pixel data; and generating a scaling timing control signal according to the receiving timing, utilizing the scaling circuit to refer to the scaling timing control signal to receive the N lines of pixel data one at a time, and scaling up the N lines of pixel data to the M lines of pixel data according to the scaling factor.

The proposed image pickup mechanism may control a pixel data receiving timing of a scaling circuit and a read/reset timing of an image sensor array such that the image sensor array and an output circuit may employ the same line rate. Hence, when applied to real-time image processing with an arbitrary scaling ratio (e.g. performing on-the-fly zoom and/or pan operations while the video display is in-motion), the proposed image pickup mechanism may provide good image quality without the use of additional storage space.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

By referring to an output timing of a plurality of lines of pixel data of an upscaled (zoomed-in) image and a scaling factor (or a scaling ratio) between the upscaled image and a source image (an image to be upscaled), the proposed image pickup mechanism may control an image sensor array to selectively read a line of pixel data of the source image during each read period corresponding to a line rate, wherein the image sensor array and an output circuit (used for outputting the lines of pixel data of the upscaled image) may employ the same line rate. The proposed image pickup mechanism may synchronize data line rates employed before and after a scaling circuit/engine performs image upscaling operations (e.g. synchronizing a line rate employed by the image sensor array and a line rate employed by the output circuit), and may provide good image quality when applied to on-the-fly zoom and/or pan operations with an arbitrary scaling ratio. Further description is provided below.

Figure 1:
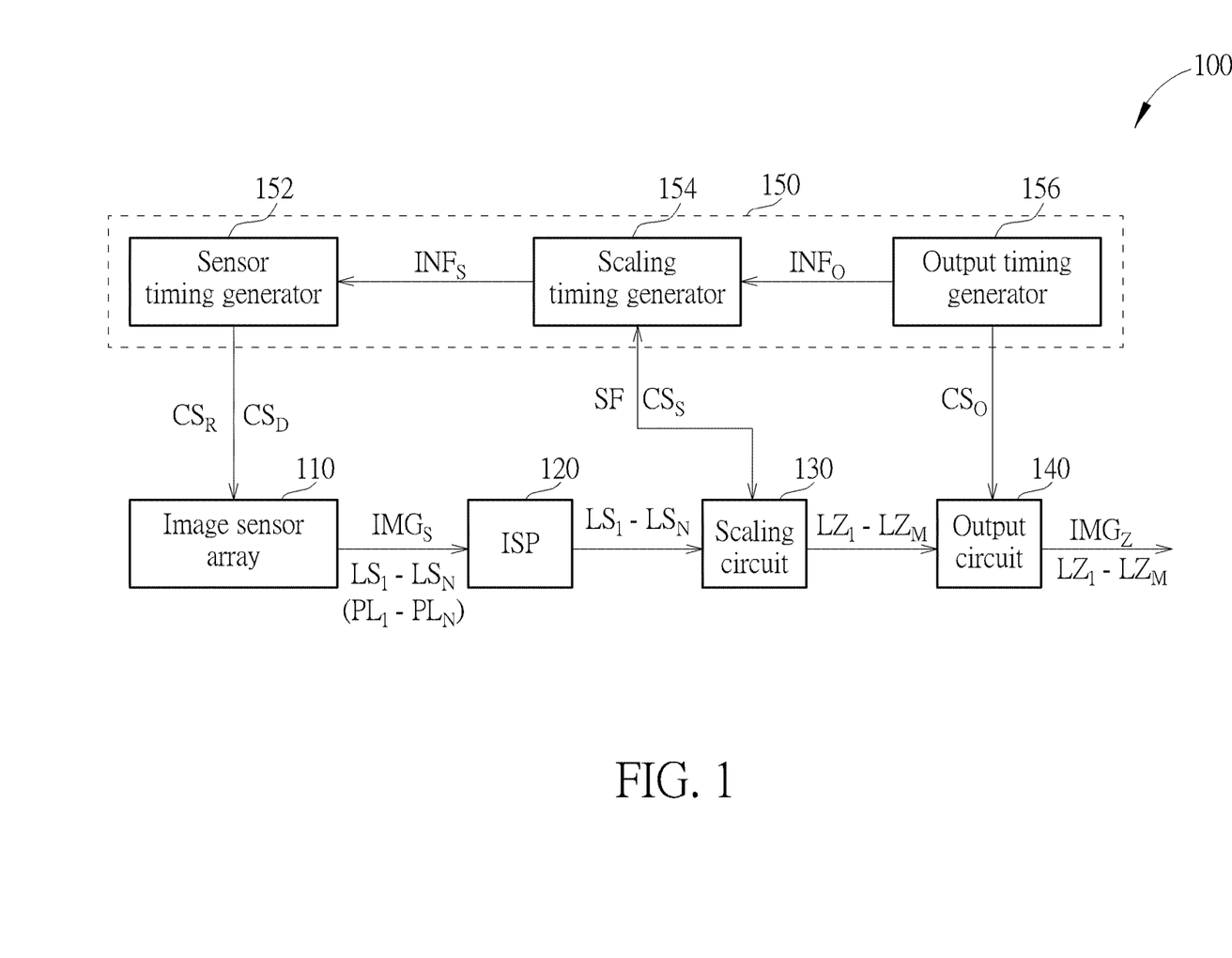
FIG. 1 is a block diagram illustrating an exemplary image pickup apparatus according to an embodiment of the present invention.

Please refer to FIG. 1, which is a block diagram illustrating an exemplary image pickup apparatus according to an embodiment of the present invention. The image pickup apparatus 100 may include, but is not limited to, an image sensor array 110, an image signal processor (ISP) 120, a scaling circuit (e.g. a scaling engine) 130, an output circuit 140, a sensor timing generator 152, a scaling timing generator 154 and an output timing generator 156. The sensor timing generator 152, the scaling timing generator 154 and the output timing generator 156 are arranged for controlling operation timings of the image sensor array 110, the scaling circuit 130 and the output circuit 140, respectively.

The image sensor array 110 is coupled to the sensor timing generator 152, and may have a plurality of pixel lines (not shown in FIG. 1) to perform image sensing operations, wherein each of the pixel lines includes a plurality of pixels. For example, the image sensor array 110 may include a plurality of pixels arranged in rows and columns (not shown in FIG. 1). In a case where the image pickup apparatus 100 zooms in a region of interest (ROI) on a display screen (corresponding to N pixel lines $PL_1$-$PL_N$ of the pixel lines such as N rows of pixels; N is a positive integer) according to a zoom-in command, the image sensor array 110 may read the N pixel lines $PL_1$-$PL_N$ one at a time (i.e. line by line) according to a read timing control signal $CS_D$ generated by the sensor timing generator 152, thereby capturing N lines of pixel data $LS_1$-$LS_N$ of a source image $IMG_S$ (an image corresponding to the ROI), wherein each of the N lines of pixel data $LS_1$-$LS_N$ includes pixel data generated from a corresponding pixel line.

The scaling circuit 130 is coupled to the image sensor 110 and the scaling timing generator 154, and may receive a scaling timing control signal $CS_S$ generated by the scaling timing generator 154, receive the N lines of pixel data $LS_1$-$LS_N$ of the source image $IMG_S$ one at a time according to the scaling timing control signal $CS_S$, and scaleup the source image $IMG_S$ to generate an upscaled image $IMG_Z$ having M lines of pixel data $LZ_1$-$LZ_M$ according to a scaling factor SF (a scaling ratio between the source image $IMG_S$ and the upscaled image $IMG_Z$), wherein M is a positive integer greater than N. It should be noted that, in some embodiments, before the N lines of pixel data $LS_1$-$LS_N$ are transmitted to the scaling circuit 130, the ISP 120 may perform related image processing operations, such as black level correction and/or border processing, on the N lines of pixel data $LS_1$-$LS_N$ to enhance image quality.

The output circuit 140 is coupled to the scaling circuit 130 and the output timing generator 156, and may receive the M lines of pixel data $LZ_1$-$LZ_M$ generated by the scaling circuit 130, and output the M lines of pixel data $LZ_1$-$LZ_M$ to a display device (e.g. a display screen; not shown in FIG. 1) one at a time according to an output timing control signal $CS_O$, wherein the output timing generator 156 may generate the output timing control signal $CS_O$ according to an output timing. By way of example but not limitation, the output circuit 140 may be implemented by an output formatter, which may convert a format of the M lines of pixel data $LZ_1$-$LZ_M$ to a predetermined display format (e.g. NTSC format or PAL format), and refer to the output timing to output the M lines of pixel data having the predetermined display format to the display device.

It should be noted that, in some embodiments, the scaling timing generator 154 is further coupled to the output timing generator 156, and may determine a receiving timing of the N lines of pixel data $LS_1$-$LS_N$ according to the output timing of the M lines of pixel data $LZ_1$-$LZ_M$ and the scaling factor SF, and accordingly generate the scaling timing control signal $CS_S$. By way of example but not limitation, the output timing generator 156 may provide output timing information $INF_O$ to the scaling timing generator 154, wherein the output timing information $INF_O$ may indicate the output timing of the M lines of pixel data $LZ_1$-$LZ_M$. Accordingly, the scaling timing generator 154 may refer to the output timing and the scaling factor SF to receive an input line (a line of pixel data) from the image sensor array 110 (or the ISP 120) or stop the input line from streaming into the scaling circuit 130, thereby controlling an input line stream of the scaling circuit 130.

The sensor timing generator 152 is further coupled to the scaling timing generator 154, and may determine a read timing of the N lines of pixel data $PL_1$-$PL_N$ according to the receiving timing, and accordingly generate the read timing control signal $CS_D$. By way of example but not limitation, the scaling timing generator 154 may provide receiving timing information $INF_S$ to the sensor timing generator 152, wherein the receiving timing information $INF_S$ may indicate the receiving timing of the N lines of pixel data $LS_1$-$LS_N$. Accordingly, the sensor timing generator 152 may refer to the receiving timing to control the access timing of the N pixel lines $PL_1$-$PL_N$ of the image sensor array 110.

Figure 2:
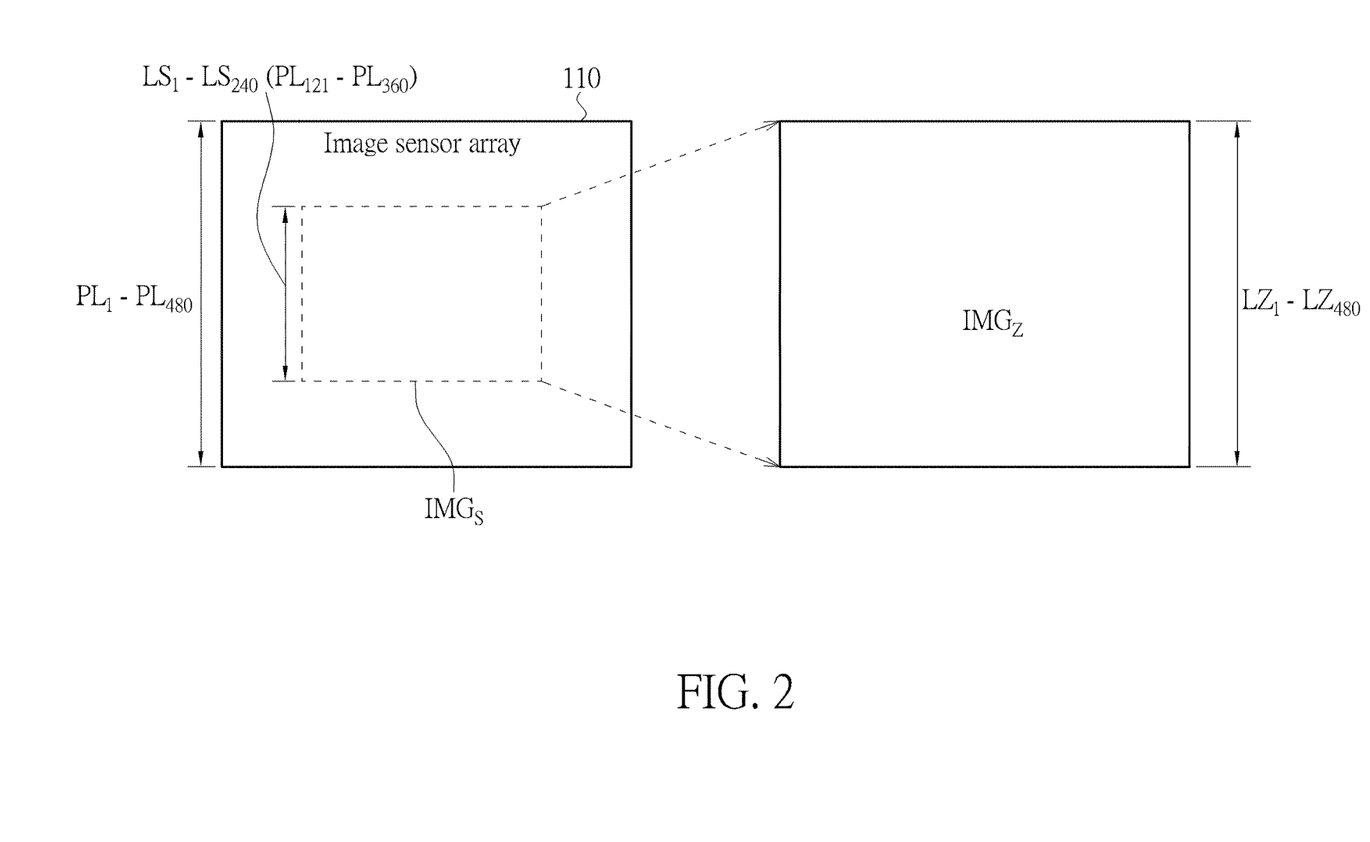
FIG. 2 is a diagram illustrating an implementation of the source image zoomed in from the upscaled image shown in FIG. 1 according to an embodiment of the present invention.
Figure 3:
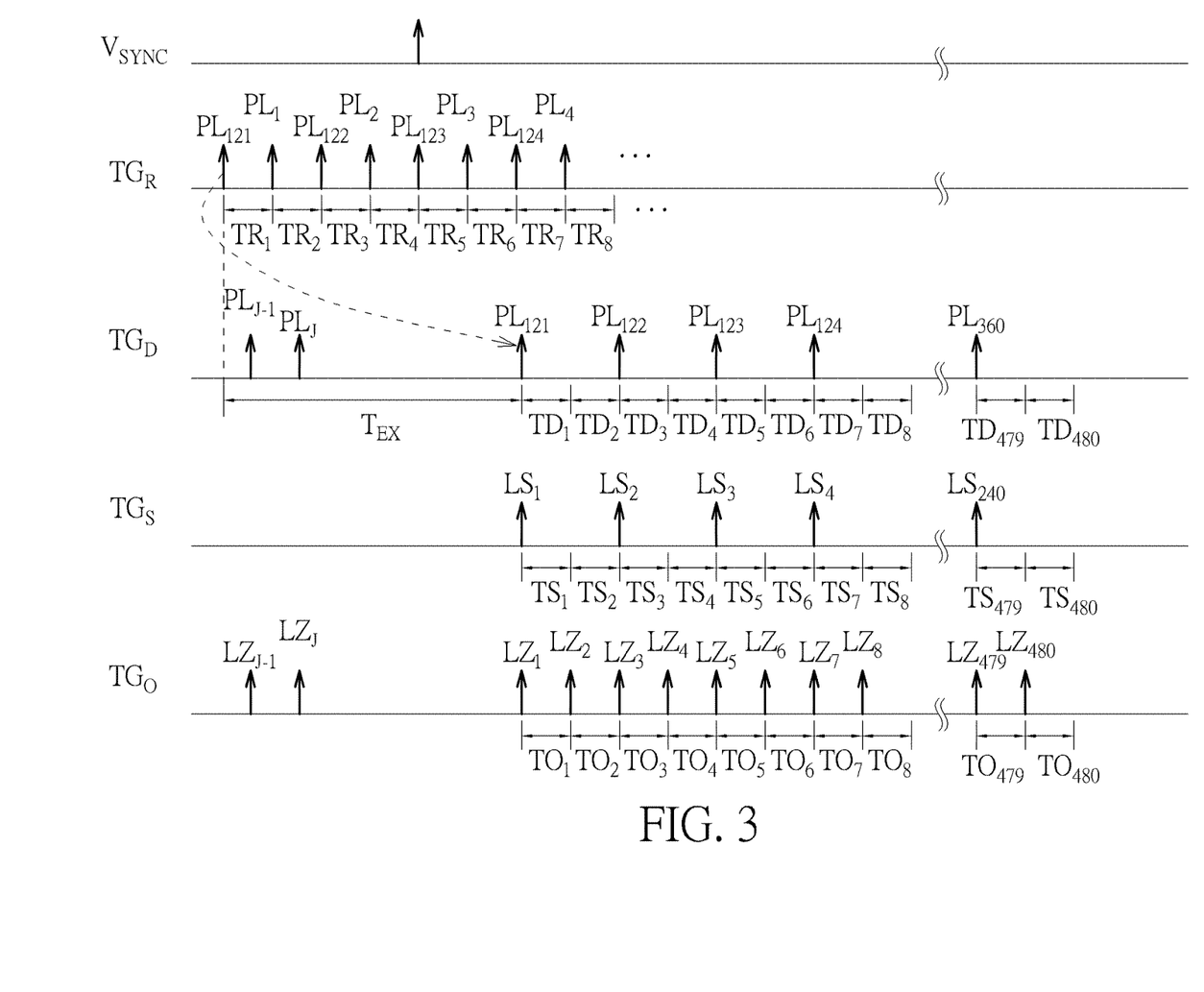
FIG. 3 is a diagram illustrating exemplary control timing associated with image upscaling operations shown in FIG. 2 according to an embodiment of the present invention.

As the proposed image pickup mechanism may refer to the output timing of the M lines of pixel data $LZ_1$-$LZ_M$ and the scaling factor SF to determine the receiving timing of the N lines of pixel data $LS_1$-$LS_N$ and the read timing of the N pixel lines, a data line rate employed before the scaling circuit 130 performs image upscaling operations (a line rate employed by the image sensor array 110) may be synchronized with a data line rate employed after the scaling circuit 130 performs image upscaling operations (a line rate employed by the output circuit 140). Please refer to FIG. 2 and FIG. 3 in conjunction with FIG. 1. FIG. 2 is a diagram illustrating an implementation of the source image $IMG_S$ zoomed in from the upscaled image $IMG_Z$ shown in FIG. 1 according to an embodiment of the present invention. FIG. 3 is a diagram illustrating exemplary control timing associated with image upscaling operations shown in FIG. 2 according to an embodiment of the present invention. In the embodiment shown in FIG. 2, the image sensor array 110 may be implemented by 480 pixel lines $PL_1$-$PL_{480}$, wherein the source image $IMG_S$ may include 240 lines of pixel data $LS_1$-$LS_{240}$ (pixel data corresponding to 240 pixel lines $PL_{121}$-$PL_{360}$; N=240), and the upscaled image $IMG_Z$ may include 480 lines of pixel data $LZ_1$-$LZ_{480}$ (e.g. fitting a full size of a display screen; M=480). In other words, the image pickup apparatus 100 may zoom in a local image displayed on the display screen (the source image $IMG_S$) to fit the full size of the display screen (e.g. the height and/or width of the display screen), wherein the number of lines of pixel data in the vertical direction of the zoomed-in image may be scaled up by two times.

In the embodiment shown in FIG. 3, the output timing generator 156 may generate a vertical synchronization signal VSYNC for streaming out each output frame, and further generate the output timing control signal $CS_O$ according to an output timing $TG_O$. Before the image pickup apparatus 100 performs image upscaling operations, the image sensor array 110 may read the 480 pixel lines $PL_1$-$PL_{480}$ one at a time at a predetermined line rate (represented by two neighboring pixel lines $PL_{J-1}$ and $PL_J$; J is a positive integer greater than 1 and less than or equal to 480), and the output circuit 140 may output the 480 lines of pixel data $LZ_1$-$LZ_{480}$ (respectively corresponding to the 480 pixel lines $PL_1$-$PL_{480}$) one at a time at the predetermined line rate (represented by two lines of pixel data $LZ_{J-1}$ and $LZ_J$ corresponding to the two neighboring pixel lines $PL_{J-1}$ and $PL_J$). After the image pickup apparatus 100 receives a zoom-in command to scale up the source image $IMG_S$, the output circuit 140 may still refer to the output timing control signal $CS_O$ to output the 480 lines of pixel data $LZ_1$-$LZ_{480}$ of the upscaled image $IMG_Z$ one at a time at the predetermined line rate (e.g. outputting the 480 lines of pixel data $LZ_1$-$LZ_{480}$ during 480 output periods $TO_1$-$TO_{480}$, indicated by the output timing $TG_O$, respectively). The scaling timing generator 154 may refer to the output timing $TG_O$ and the scaling factor SF to determine a receiving timing $TG_S$ of the 240 lines of pixel data $LS_1$-$LS_{240}$ received by the scaling circuit 240, wherein during 480 receiving periods $TS_1$-$TS_{480}$ indicated by the receiving timing $TG_S$ respectively corresponding to the 480 output periods $TO_1$-$TO_{480}$, the scaling circuit 130 may selectively receive a line of pixel data during each of the 480 receiving periods $TS_1$-$TS_{480}$ according to the scaling timing control signal $CS_S$, so as to receive the 240 lines of pixel data $LS_1$-$LS_{240}$ during 240 receiving periods $TS_1$, $TS_3$, ..., $TS_{479}$ (N of the 480 receiving periods $TS_1$-$TS_{480}$) respectively and not to receive the 240 lines of pixel data $LS_1$-$LS_{240}$ during other 240 receiving periods $TS_2$, $TS_4$, ..., $TS_{480}$ ((M–N) of the 480 receiving periods $TS_1$-$TS_{480}$).

In addition, when the scaling timing generator 154 determines the receiving timing $TG_S$ of the 240 lines of pixel data $LS_1$-$LS_{240}$, the sensor timing generator 152 may refer to the receiving timing $TG_S$ to determine a read timing $TG_D$ of the 240 pixel lines $PL_{121}$-$PL_{360}$ wherein during 480 read periods $TD_1$-$TD_{480}$ indicated by the read timing $TG_D$ respectively corresponding to the 480 receiving periods $TS_1$-$TS_{480}$, the image sensor array 110 may selectively read a pixel line during each of the 480 read periods $TD_1$-$TD_{480}$ according to the read timing control signal $CS_D$, so as to read the 240 pixel lines $PL_{121}$-$PL_{360}$ during 240 read periods $TD_1$, $TD_3$, ..., $TD_{479}$ (N of the 480 read periods $TD_1$-$TD_{480}$) respectively and not to read the 240 pixel lines $PL_{121}$-$PL_{360}$ (or any pixel lines) during other 240 read periods $TD_2$, $TD_4$, ..., $TD_{480}$ ((M–N) of the 480 read periods $TD_1$-$TD_{480}$). As the image sensor array 110 may refer to the output timing $TG_O$ and the line reception requirements of the scaling circuit 130 (the receiving timing $TG_S$) to determine not to read a pixel line during one or more read periods indicated by the reading timing $TG_D$, the image sensor array 110 may operate at the predetermined line rate at which the output circuit 140 outputs the 480 lines of pixel data $LZ_1$-$LZ_{480}$.

In some embodiments, the sensor timing generator 152 may further determine a rest timing $TG_R$ of the 480 pixel lines $PL_1$-$PL_{480}$ according to the receiving timing $TG_S$, and accordingly generate a rest timing control signal $CS_R$, wherein the image sensor array 110 may refer to the rest timing control signal $CS_R$ to rest a pixel line at a point in time, which is a predetermined exposure time $T_{EX}$ (or a charge accumulation time) ahead of starting reading out the pixel line. It should be noted that in a case where the image pickup apparatus 100 utilizes an electronic rolling shutter to capture images, there is no physical shield to block the light. Charges accumulated in a pixel will flow into nearby pixels if the accumulated charges exceed the capacity of the charge container of the pixel, resulting in degraded image quality. As the image sensor array 110 may refer to the rest timing control signal $CS_R$ to rest non-output line (s) (or unread/unused line (s) such as at least one of the pixel lines $PL_1$-$PL_{120}$ and $PL_{361}$-$PL_{480}$), charges accumulated in a pixel neighboring a pixel to be read out may not flow into the pixel to be read out.

By way of example but not limitation, during 480 reset periods $TR_1$-$TR_{480}$ indicated by the reset timing $TG_R$ respectively corresponding to the 480 read periods $TD_1$-$TD_{480}$, the image sensor array 110 may selectively reset one of the 240 pixel lines $PL_{121}$-$PL_{360}$ during each of the 480 reset periods $TR_1$-$TR_{480}$ according to the reset timing control signal $CS_R$, so as to reset the 240 pixel lines $PL_{121}$-$PL_{360}$ during 240 reset periods $TR_1$, $TR_3$, $TR_{479}$ (N of the 480 reset periods $TR_1$-$TR_{480}$) respectively and reset at least one of the pixel lines $PL_1$-$PL_{480}$ different from the 240 pixel lines $PL_{121}$-$PL_{360}$ during at least one of 240 reset periods $TR_2$, $TR_4, \ldots, TR_{480}$ ((M−N) of the 480 reset periods $TR_1$-$TR_{480}$) respectively. In the embodiment shown in FIG. 3, the image sensor array 110 may reset the 240 pixel lines $PL_1$-$PL_{120}$ and $PL_{361}$-$PL_{480}$ different from the 240 pixel lines $PT_{121}$-$PL_{360}$ ((M−N) pixel lines) during the 240 reset periods $TR_2$, $TR_4, \ldots, TR_{480}$ ((M−N) reset periods) respectively.

In view of the above, the proposed image pickup mechanism may control the scaling circuit to selectively allow reception of lines of pixel data to thereby determine a receiving timing, and may refer to the receiving timing to determine an operation timing of the image sensor array (a read timing and/or a reset timing). Hence, the image sensor array and the output circuit may employ the same line rate during image upscaling operations.

Please note that the circuit structure shown in FIG. 1 is for illustrative purposes only, and is not meant to be a limitation of the present invention. For example, the sensor timing generator 152, the scaling timing generator 154 and the output timing generator 156 may be implemented by a timing control circuit 150, wherein the timing control circuit 150 may generate the output timing control signal $CS_O$ according to the output timing of the M lines of pixel data $LZ_1$-$LZ_M$, determine the receiving timing of the N lines of pixel data $LS_1$-$LS_N$ according to the output timing and the scaling factor SF and accordingly generating the scaling timing control signal $CS_S$, and determine the read timing of the N pixel lines $PL_1$-$PL_N$ according to the receiving timing and accordingly generating the read timing control signal $CS_D$. As long as the scaling circuit may be controlled to selectively receive a line of pixel data according to the output timing of lines of pixel data and the scaling factor, it is possible to employ other timing control structures.

Additionally, in some embodiments where the output circuit 140 outputs the M lines of pixel data $LZ_1$-$LZ_M$ at a predetermined line rate according to the output timing control signal $CS_O$, the image sensor array 110 may further access at least one pixel line different from the N pixel lines $PL_1$-$PL_N$ according to the read timing control signal $CS_D$ and/or reset timing control signal $CS_R$ to thereby enhance image quality. Further description is given below.

Figure 4:
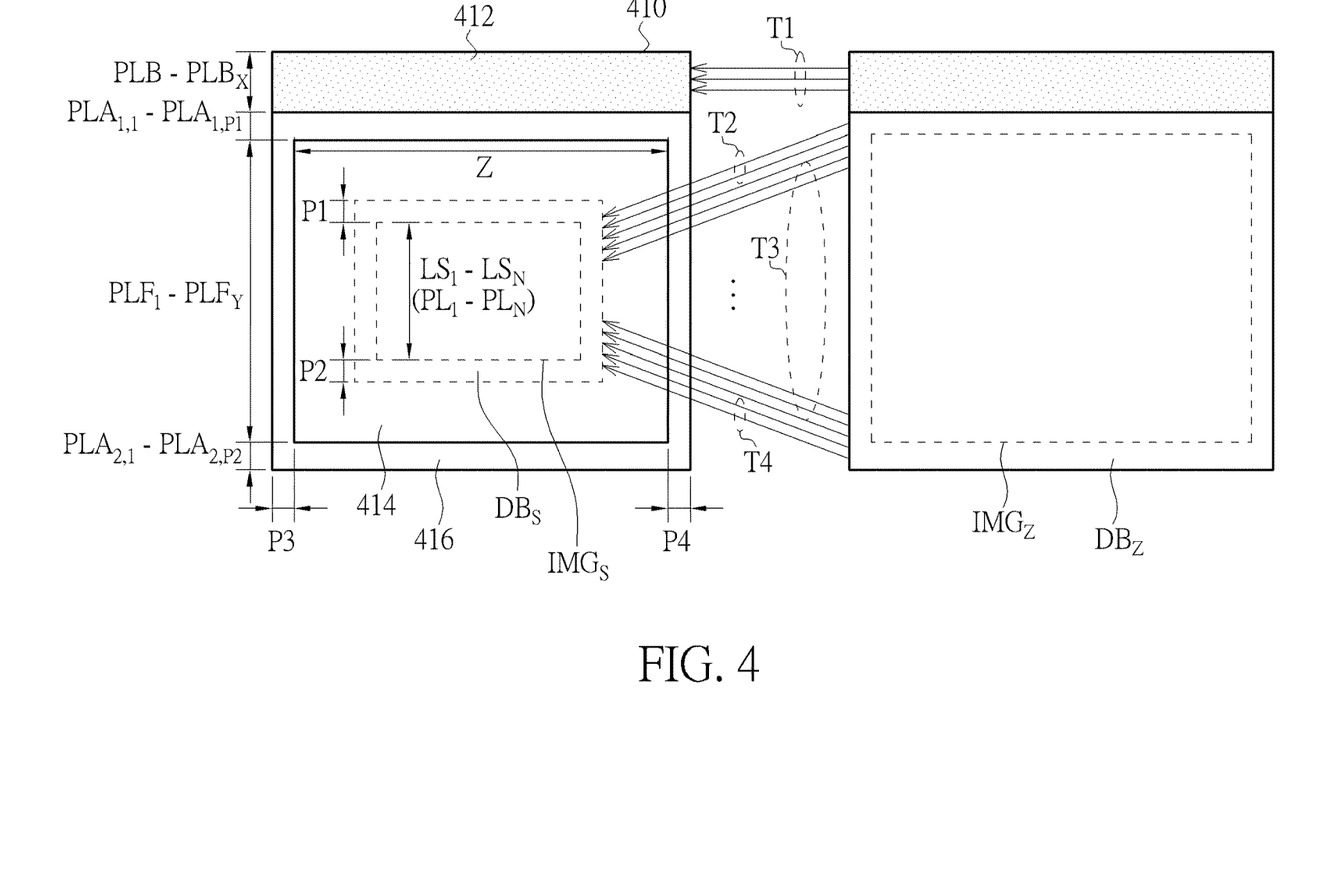
FIG. 4 is an implementation of the image sensor array shown in FIG. 1 according to an embodiment of the present invention.

Please refer to FIG. 4 in conjunction with FIG. 1. FIG. 4 is an implementation of the image sensor array 110 shown in FIG. 1 according to an embodiment of the present invention. In this implementation, a plurality of pixel lines of the image sensor array 410 may include, but is not limited to, X dark pixel lines $PLB_1$-$PLB_X$ (X is a positive integer greater than one) located in a dark pixel region 412, Y pixel lines $PLF_1$-$PLF_Y$ (Y is a positive integer greater than one) located in an active pixel region 414, and P1 pixel lines $PLA_{1,1}$-$PLA_{1,P1}$ (P1 is a positive integer) and P2 pixel lines $PLA_{2,1}$-$PLA_{2,P2}$ (P2 is a positive integer) located in a border pixel region 416. The dark pixel region 412 is used for black level correction, the active pixel region 414 is used for photoelectric conversion to generate image data for display, and the border pixel region 416 is used for processing image borders. In addition, each of the Y pixel lines $PLF_1$-$PLF_Y$ may include Z pixels (Z is a positive integer greater than one), and the N pixel lines $PL_1$-$PL_N$ are N of the Y pixel lines $PLF_1$-$PLF_Y$.

In a case where the output circuit 140 outputs the M lines of pixel data $LZ_1$-$LZ_M$ one at a time according to a predetermined line rate according to the output timing control signal $CS_D$, the image sensor array 410 may operate at the predetermined line rate to access the pixel lines thereof. By way of example but not limitation, the image sensor array 410 may read the X dark pixel lines $PLB_1$-$PLB_X$ one at a time at the predetermined line rate according to the output timing control signal $CS_D$ during a time interval T1, read P1 pixel lines adjacent to the N pixel lines $PL_1$-$PL_N$ one at a time at the predetermined line rate according to the output timing control signal $CS_D$ during a time interval T2, selectively read the N pixel lines $PL_1$-$PL_N$ at the predetermined line rate during a time interval T3 (e.g. a time interval including the read periods $TD_1$-$TD_{480}$ shown in FIG. 2), and/or read P2 pixel lines adjacent to the N pixel lines $PL_1$-$PL_N$ one at a time at the predetermined line rate according to the output timing control signal $CS_D$ during a time interval T4. In other words, the image sensor array 410 may read a pixel line one at a time during each read period within at least one of the time interval T1, the time interval T2 and the time interval T4, and selectively read a pixel line during each read period within the time interval T3 (i.e. alternately reading and not reading the N pixel lines $PL_1$-$PL_N$). Hence, the ISP 120 may perform black level correction according to pixel data of the X dark pixel lines $PLB_1$-$PLB_X$, and perform image border processing according to the P1 pixel lines and the P2 pixel lines adjacent to the N pixel lines $PL_1$-$PL_N$.

By way of example but not limitation, in a case where a size of the active pixel region 414 (a display area) corresponds to 640 columns of pixels by 480 rows of pixels (640×480; Z=640 and Y=480), a width of the border pixel region 416 corresponds to 4 pixels (P1=P2=P3=P4=4), and the image pickup apparatus 100 scale up the source image $IMG_S$ having 320×240 pixels (320 columns of pixels by 240 rows of pixels; N=240) to generate the upscaled image $IMG_Z$ fitting the display area (M=480), the image sensor array 410 may utilize the predetermined line rate to access 328×248 pixels (corresponding to the source image $IMG_S$ and border pixel data $DB_S$), and the output circuit 140 may utilize the same predetermined line rate to output the 488 rows of pixel data to thereby generate 648×488 pixel data (corresponding to the upscaled image $IMG_Z$ and border pixel data $DB_Z$), wherein the output circuit 140 may output lines of pixel data corresponding to the P1 pixel lines and the P2 pixel lines adjacent to the N pixel lines $PL_1$-$PL_N$ one at a time at the predetermined line rate. In other words, the number of lines of border pixel data corresponding to the upscaled image $IMG_Z$ (i.e. P1+P2) may be identical to the number of lines of border pixel data corresponding to the source image $IMG_S$.

In some embodiments, the image sensor array 410 may reset the N pixel lines $PL_1$-$PL_N$ and (M−N) of the pixel lines different from the N pixel lines $PL_1$-$PL_N$ one at a time at the predetermined line rate according to the reset timing control signal $CS_R$. For example, each of the (M−N) pixel lines may include at least one pixel located in the active pixel region 414. In other words, the (M−N) pixel lines may be (M−N) of the remaining (Y−N) pixel lines $PLF_1$-$PLF_Y$. In another example, the image sensor array 410 may reset the X dark pixel lines $PLB_1$-$PLB_X$, the P1 pixel lines adjacent to the N pixel lines $PL_1$-$PL_N$, and/or the P2 pixel lines adjacent to the N pixel lines $PL_1$-$PL_N$ one at a time at the predetermined line rate according to the reset timing control signal $CS_R$.

It should be noted that an order in which the image sensor array 410 reads (or resets) the dark pixel region 412, the active pixel region 414 and the border pixel region 416 may be determined according to actual design requirements. By way of example but not limitation, the sensor timing generator 152 may enable the image sensor array 410 to read the X dark pixel lines $PLB_1$-$PLB_X$, the P1 pixel lines adjacent to the N pixel lines $PL_1$-$PL_N$, and the P2 pixel lines adjacent to the N pixel lines $PL_1$-$PL_N$ in sequence. In addition, the structure of pixel regions shown in FIG. 4 is for illustrative purposes only, and is not meant to be a limitation of the present invention. In other words, it is possible to employ other pixel structures.

Figure 5:
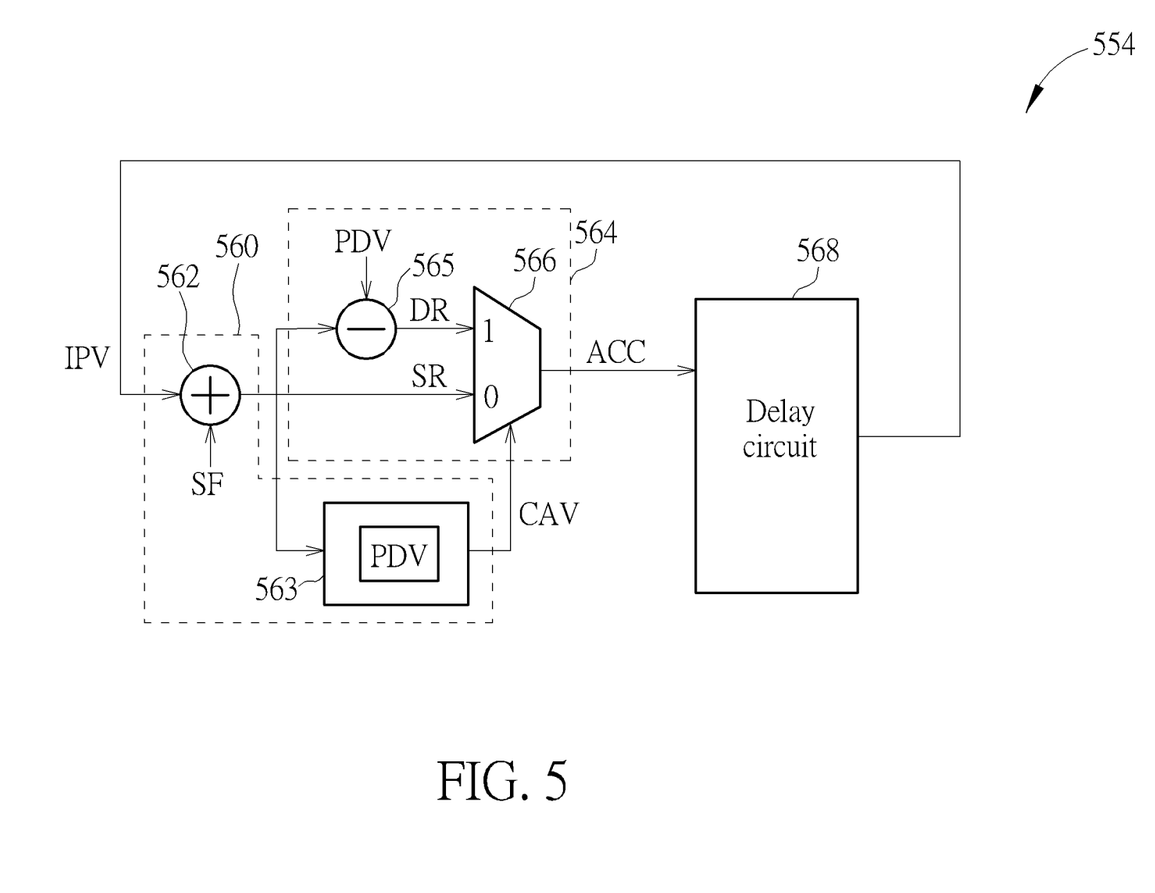
FIG. 5 is an implementation of the scaling timing generator shown in FIG. 1 according to an embodiment of the present invention.
Figure 6:
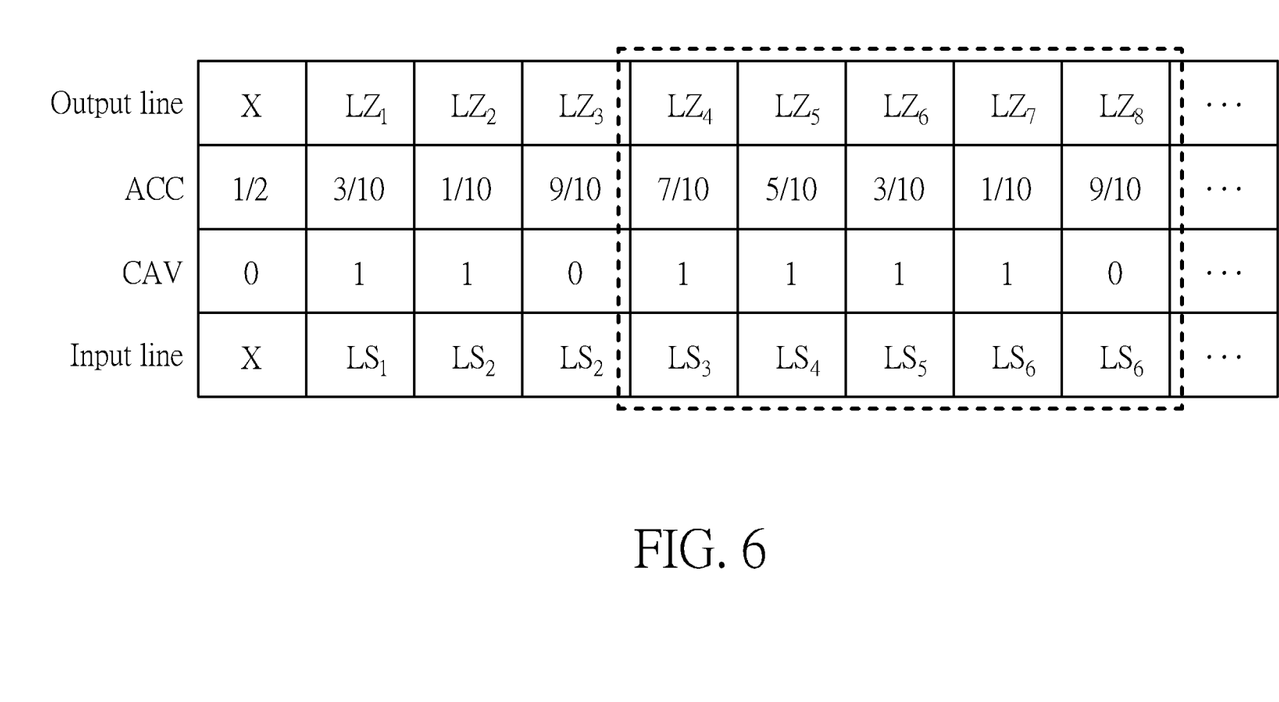
FIG. 6 is a diagram illustrating exemplary receiving timing determination of the scaling timing generator shown in FIG. 5 according to an embodiment of the present invention.

Moreover, as described above, the read timing and/or the reset timing of the N pixel lines $PL_1$-$PL_N$ of the image sensor 110 shown in FIG. 1 may be determined according to according to the receiving timing of the N lines of pixel data $LS_1$-$LS_N$. In order to facilitate an understanding of the present invention, an exemplary implementation is given in the following for further description of the receiving timing determination of the scaling timing generator 154 shown in FIG. 1. It should be noted that, as long as a timing generator capable of controlling a scaling circuit to selectively receive a line of pixel data during each of M receiving periods (respectively corresponding to M output periods indicated by the output timing of the M lines of pixel data $LZ_1$-$LZ_M$), other circuit implementations are feasible. Please refer to FIG. 5 and FIG. 6 in conjunction with FIG. 1. FIG. 5 is an implementation of the scaling timing generator 154 shown in FIG. 1 according to an embodiment of the present invention. FIG. 6 is a diagram illustrating exemplary receiving timing determination of the scaling timing generator 554 shown in FIG. 5 according to an embodiment of the present invention. For illustrative purposes, consider the following example where the source image $IMG_S$ having 384 lines of pixel data is zoomed in to generate the upscaled image $IMG_Z$ having 480 lines of pixel data and the scaling factor SF is ⅘. However, this is not intended to limit the present invention.

The scaling timing generator 554 may include, but is not limited to, an adder 562, a comparator 563, a subtractor 565, a multiplexer 566 and a delay circuit 568. Before the image sensor array 110 reads the pixel line $LS_1$, an intermediate value ACC may be ½, and a carry value CAV may be 0. When entering a receiving period corresponding to an output period of the line of pixel data $LZ_1$ (e.g. the receiving period $TS_1$ corresponding to the output period $TO_1$ shown in FIG. 2), the delay circuit 568 may output the received intermediate value ACC (½) as an input value IPV of the adder 562. Next, the adder 562 may sum the intermediate value ACC and the scaling factor SF to generate a sum result SR (13/10), and the subtractor 565 may subtract a predetermined value PDV (e.g. 1) from the sum result SR to generate a subtraction result DR (3/10). As the sum result SR is greater than the predetermined value PDV, the comparator 563 may update the carry value CAV to 1 such that the multiplexer 566 may select an output of the subtractor 565 (the subtraction result DR) as an output thereof (the intermediate value ACC). Please note that when the carry value CAV is 1, the scaling timing control signal $CS_S$ (e.g. having a high signal level) generated by the scaling timing generator 554 may enable the scaling circuit 130 to receive the line of pixel data $LS_1$. In other words, in a case where an output line is the line of pixel data $LZ_1$, an input line is the line of pixel data $LS_1$.

During another receiving period next to the receiving period (e.g. the receiving period $TS_2$ shown in FIG. 2), the delay circuit 568 may output the intermediate value ACC which is generated during the receiving period, and use the currently outputted intermediate value ACC as the input value IPV of the adder 562 to thereby update the input value IPV. In other words, the delay circuit 568 may delay the received intermediate value ACC an output period associated with a line of pixel data before outputting the received intermediate value ACC to the adder 562. Accordingly, the scaling timing generator 554 may determine a receiving timing corresponding to an zoom-in scenario where the scaling factor SF is ⅘. For example, the five lines of pixel data $LZ_4$-$LZ_8$ outputted by the output circuit 140 may come from the four lines of pixel data $LS_3$-$LS_5$ received by the scaling circuit 130.

In an alternative design, the scaling timing generator 554 may be implemented by other circuit structures. By way of example but not limitation, the adder 562 and the comparator 563 may be implemented by a processing circuit 560, wherein the processing circuit 560 may receive the input value IPV during a receiving period (a receiving period indicated by the receiving timing of the N lines of pixel data $LS_1$-$LS_N$), sum the input value IPV and the scaling factor SF to generate the sum result SR, and compare the sum result SR with the predetermined value PDV (e.g. 1) to generate the scaling timing control signal $CS_S$. When the sum result SR is greater than or equal to the predetermined value PDV (e.g. the carry value CAV is 1), the scaling circuit 130 may refer to the scaling timing control signal $CS_S$ to receive one of the N lines of pixel data $LS_1$-$LS_N$. When the sum result SR is less than the predetermined value PDV (e.g. the carry value CAV is 0), the scaling circuit 130 may refer to the scaling timing control signal $CS_S$ not to receive any line of pixel data In another example, the subtractor 565 and the multiplexer 566 may be implemented by a processing circuit 564, wherein the processing circuit 564 is coupled between the processing circuit 560 and the delay circuit 568. When the sum result SR is greater than or equal to the predetermined value PDV (e.g. the carry value CAV is 1), the processing circuit 564 may subtract the predetermined value PDV from the sum result SR to generate a subtraction result DR, and uses the subtraction result DR as the intermediate value ACC. When the sum result SR is less than the predetermined value PDV (e.g. the carry value CAV is 0), the processing circuit 564 may use the sum result SR as the intermediate value ACC.

Additionally, the predetermined value PDV and/or an initial value of the intermediate value ACC may be determined according to actual design requirements. In brief, as long as a scaling timing generator (or a timing control circuit) may determine a signal level of the scaling timing control signal $CS_S$ (e.g. the carry value CAV) corresponding to each receiving period (or each output period) according to the output timing of the M lines of pixel data $LZ_1$-$LZ_M$ and the scaling factor SF, and accordingly determine the receiving timing of the N lines of pixel data $LS_1$-$LS_N$ and the scaling timing control signal $CS_S$, various modifications and alternatives fall within the scope of the prevent invention.

Figure 7:
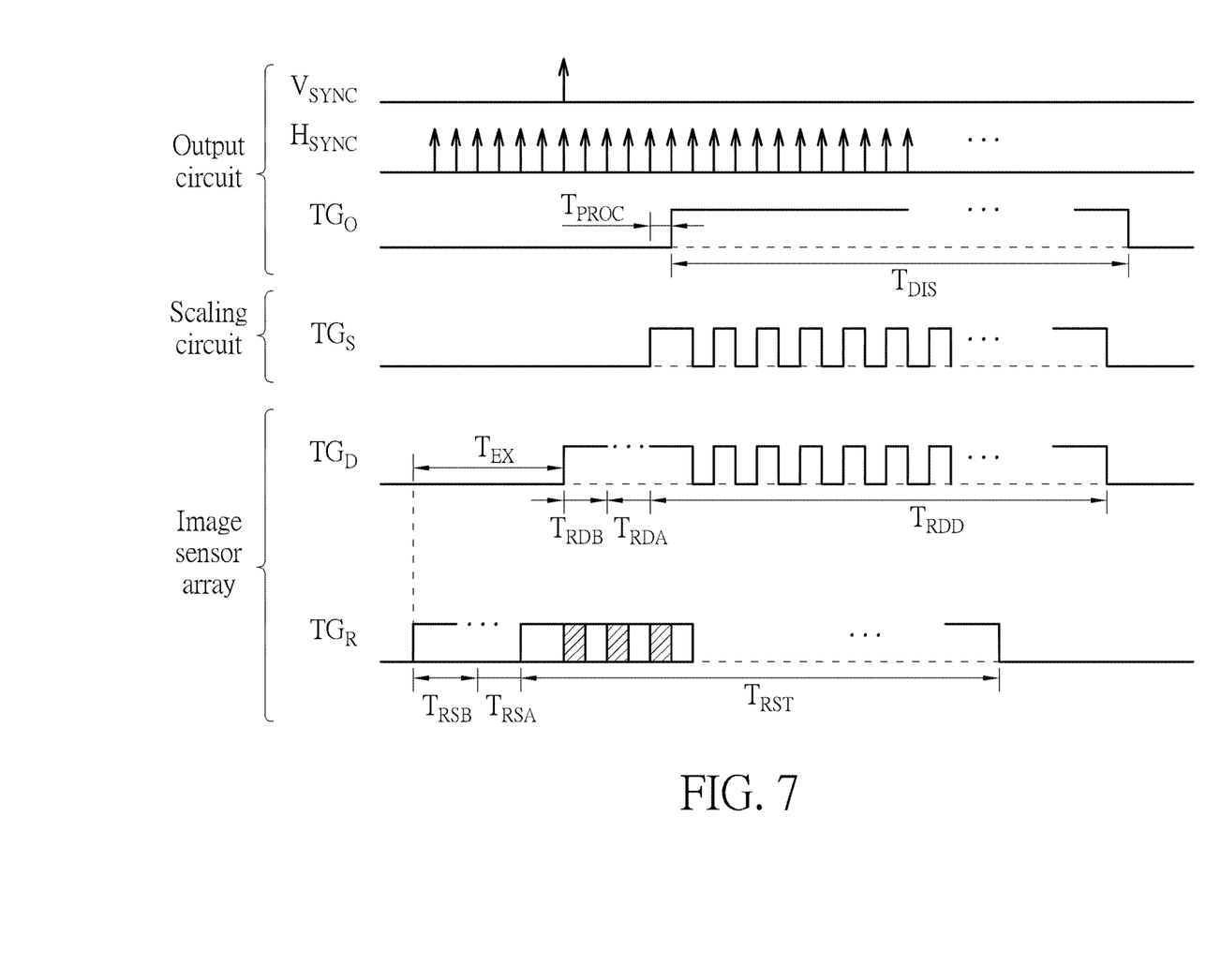
FIG. 7 is a diagram illustrating exemplary control timing associated with an upscaled image frame generated by the image pickup apparatus shown in FIG. 1 according to an embodiment of the present invention.

Please refer to FIG. 7 in conjunction with FIG. 1. FIG. 7 is a diagram illustrating exemplary control timing associated with an upscaled image frame generated by the image pickup apparatus 100 shown in FIG. 1 according to an embodiment of the present invention. In this embodiment, the output circuit 140 may generate a vertical synchronization signal $V_{SYNC}$ and a horizontal synchronization signal $H_{SYNC}$, refer to the vertical synchronization signal $V_{SYNC}$ to start to output the upscaled image frame (e.g. an image frame of the upscaled image $IMG_Z$), and refer to the horizontal synchronization signal $H_{SYNC}$ to start to output lines of pixel data (e.g. the M lines of pixel data $LZ_1$-$LZ_M$). Hence, during a display line valid period $T_{DIS}$ indicated by the output timing $TG_O$, the output circuit 140 may output the M lines of pixel data $LZ_1$-$LZ_M$ to a display device one at a time at a predetermined line rate according to the output timing control signal $CS_O$, wherein the predetermined line rate may correspond to a frequency of the horizontal synchronization signal $H_{SYNC}$. In other words, the output circuit 140 may output the M lines of pixel data $LZ_1$-$LZ_M$ during M output periods within the display line valid period $T_{DIS}$ (e.g. the output periods $TO_1$-$TO_{480}$ shown in FIG. 3) respectively.

The scaling timing generator 154 may determine the receiving timing $TG_S$ according to the output timing $TG_O$, such that the scaling circuit 130 may refer to the scaling timing control signal $CS_S$ to selectively receive a line of pixel data during each receiving period indicated by the receiving timing $TG_S$. In other words, during M receiving periods indicated by the receiving timing $TG_S$ respectively corresponding to the M output periods (e.g. the receiving periods $TS_1$-$TS_{480}$ shown in FIG. 3), the scaling circuit 130 may receive the N lines of pixel data $LS_1$-$LS_N$ during N of the M receiving periods respectively, and may not receive the N lines of pixel data $LS_1$-$LS_N$ during (M−N) of the M receiving periods. By way of example but not limitation, the scaling timing generator 154 may employ the circuit structure shown in FIG. 5 to determine whether to receive a line of pixel data during a receiving period, and accordingly determine the receiving timing $TG_S$ and the corresponding scaling timing control signal $CS_S$. It should be noted that, in this embodiment, the scaling circuit 130 may refer to the scaling timing control signal $CS_S$ to start to receive the N lines of pixel data $LS_1$-$LS_N$ at a point in time, which is a processing time $T_{PROC}$ ahead of starting outputting the M lines of pixel data $LZ_1$-$LZ_M$.

After the receiving timing $TG_S$ is determined, the sensor timing generator 152 may refer to the receiving timing $TG_S$ to determine the read timing $TG_D$ (or an output timing of data lines outputted by the ISP 120) and the reset timing $TG_R$. Hence, the image sensor array 110 may selectively read a pixel line during each read period according to the read timing control signal $CS_D$, and selectively reset one of the N pixel lines $PL_1$-$PL_N$ during each reset period according to the reset timing control signal $CS_R$, wherein the image sensor array 110 may refer to the reset timing control signal $CS_R$ to reset a pixel line at a point in time, which is the predetermined exposure time $T_{EX}$ ahead of starting reading out the pixel line. Specifically, during a readout line valid period $T_{RDD}$ indicated by the read timing $TG_D$ (corresponding to M read periods corresponding to the M receiving periods, such as the read periods $TD_1$-$TD_{480}$ shown in FIG. 3), the image sensor array 110 may read the N pixel lines $PL_1$-$PL_N$ during N of the M read periods respectively and may not to read the N pixel lines $PL_1$-$PL_N$ during (M−N) of the M read periods according to the read timing control signal $CS_D$. During a reset line valid period $T_{RST}$ indicated by the reset timing $TG_R$ (corresponding to M rest periods corresponding to the M read periods), the image sensor array 110 may refer to the reset timing control signal $CS_R$ to reset the N pixel lines $PL_1$-$PL_N$ during N of the M reset periods respectively, and to reset (M−N) of the pixel lines different from the N pixel lines $PL_1$-$PL_N$ (e.g. pixel lines including pixels located in an active pixel region) during (M−N) of the M reset periods (represented by slash areas) respectively.

In some embodiments, during another time period different from the readout line valid period $T_{RDD}$ indicated by the read timing $TG_D$, the image sensor array 110 may refer to the read timing control signal $CS_D$ to read at least one pixel line different from the N pixel lines $PL_1$-$PL_N$. By way of example but not limitation, during a plurality of read periods different from the M read periods indicated by the read timing $TG_D$ (e.g. a dark readout line valid period $T_{RDB}$ ahead of the readout line valid period $T_{RDD}$), the image sensor array 110 may read a plurality of dark pixel lines different from the N pixel lines $PL_1$-$PL_N$ (e.g. the X dark pixel lines $PLB_1$-$PLB_X$ shown in FIG. 4) one at a time at the predetermined line rate according to the read timing control signal $CS_D$. In another example, during P read periods (P is a positive integer) different from the M read periods indicated by the read timing $TG_D$ (e.g. an additional readout line valid period $T_{RDA}$ ahead of the readout line valid period $R_{DDD}$), the image sensor array 110 may read P pixel lines adjacent to the N pixel lines $PL_1$-$PL_N$ (e.g. the P1 pixel lines and/or the P2 pixel lines adjacent to the N pixel lines $PL_1$-$PL_N$ shown in FIG. 4) one at a time at the predetermined line rate according to the read timing control signal $CS_D$.

Similarly, in some embodiments, the e image sensor array 110 may reset at least one pixel line different from the N pixel lines $PL_1$-$PL_N$ according to the reset timing control signal $CS_R$. By way of example but not limitation, during a dark rest line valid period $T_{RSB}$ indicated by the reset timing $TG_R$, the image sensor array 110 may refer to the reset timing control signal $CS_R$ to reset the dark pixel lines one at a time at the predetermined line rate. In another example, during an additional rest line valid period $T_{RSA}$ indicated by the reset timing $TG_R$, the image sensor array 110 may refer to the reset timing control signal $CS_R$ to reset the P pixel lines adjacent to the N pixel lines $PL_1$-$PL_N$ one at a time at the predetermined line rate.

As a person skilled in the art can readily understand the timing control operation shown in FIG. 7 after reading the above paragraph directed to FIGS. 1-6, further description is omitted here for brevity.

Figure 8:
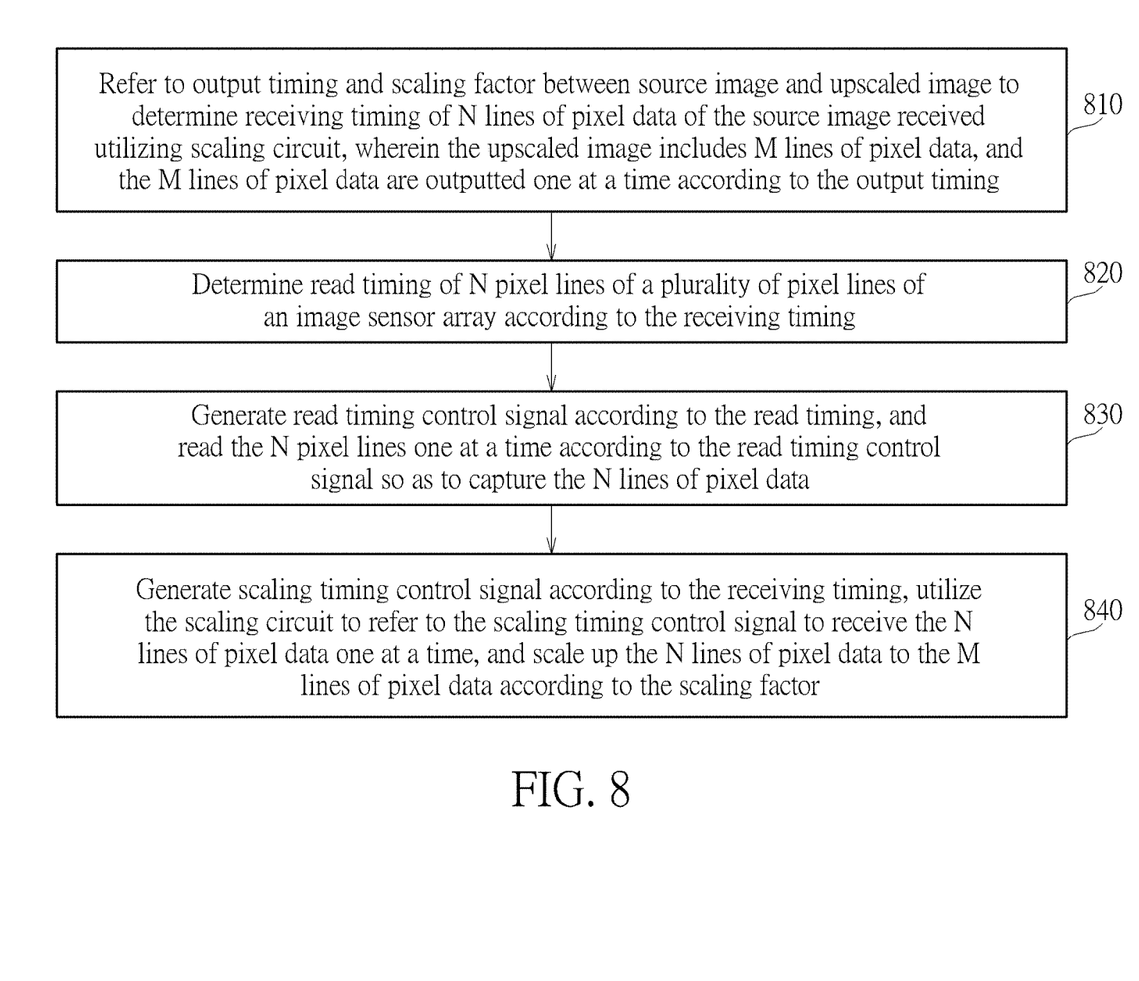
FIG. 8 is a flow chart of an exemplary image pickup method for image upscaling according to an embodiment of the present invention.

The proposed image pickup mechanism may be summarized in FIG. 8. FIG. 8 is a flow chart of an exemplary image pickup method for image upscaling according to an embodiment of the present invention. Provided that the result is substantially the same, steps are not required to be executed in the exact order shown in FIG. 8. Other intermediate steps can be added. For illustrative purposes, the image pickup method shown in FIG. 8 is described with reference to the image pickup apparatus 100 shown in FIG. 1. However, this is not meant to be a limitation of the present invention. The image pickup method shown in FIG. 8 may be summarized below.

Step 810: Refer to an output timing and the scaling factor SF between the source image $IMG_S$ and the upscaled image IMG to determine a receiving timing of the N lines of pixel data $LS_1$-$LS_N$ of the source image $IMG_S$ received utilizing the scaling circuit 130, wherein the upscaled image $IMG_Z$ includes the M lines of pixel data $LZ_1$-$LZ_M$, which are outputted one at a time according to the output timing.

Step 820: Determine a read timing of the N pixel lines $PL_1$-$PL_N$ of the plurality of pixel lines of the image sensor array 110 according to the receiving timing.

Step 830: Generate the read timing control signal $CS_D$ according to the read timing, and reading the N pixel lines $PL_1$-$PL_N$ one at a time according to the read timing control signal $CS_D$ so as to capture the N lines of pixel data $LS_1$-$LS_N$.

Step 840: Generate the scaling timing control signal $CS_S$ according to the receiving timing, utilize the scaling circuit 130 to refer to the scaling timing control signal $CS_S$ to receive the N lines of pixel data $LS_1$-$LS_N$ one at a time, and scale up the N lines of pixel data $LS_1$-$LS_N$ to the M lines of pixel data $LZ_1$-$LZ_M$ according to the scaling factor SF.

In step 830, the image sensor array 110 may refer to the read timing control signal $CS_D$ to selectively read a pixel line during each read period. In step 840, the scaling circuit 130 may refer to the scaling timing control signal $CS_S$ to selectively receive a line of pixel data during each receiving period indicated by the receiving timing.

In some embodiments, the proposed image pickup method may further determine the reset timing $TG_R$ of the plurality of pixel lines of the image sensor array 110 according to the receiving timing, accordingly generate the reset timing control signal $CS_R$, and reset the N lines of pixel data $LS_1$-$LS_N$ and (M-N) of the plurality of pixel lines different from the N lines of pixel data $LS_1$-$LS_N$ one at a time at the predetermined line rate according to the reset timing control signal $CS_R$. As a person skilled in the art can readily understand the operation of each step shown in FIG. 8 after reading the above paragraph directed to FIGS. 1-7, further description is omitted here for brevity.

To sum up, the proposed image pickup mechanism may control a pixel data receiving timing of a scaling circuit and a read/reset timing of an image sensor array such that the image sensor array and an output circuit may employ the same line rate. Hence, when applied to real-time image processing with an arbitrary scaling ratio (e.g. performing on-the-fly zoom and/or pan operations while the video display is in-motion), the proposed image pickup mechanism may provide good image quality without the use of additional storage space.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image pickup apparatus, comprising:
an image sensor array, having a plurality of pixel lines, the image sensor array arranged for reading N of the pixel lines one at a time according to a read timing control signal so as to capture N lines of pixel data of a source image, wherein N is a positive integer;
a scaling circuit, coupled to the image sensor array, the scaling circuit arranged for receiving a scaling timing control signal, receiving the N lines of pixel data of the source image one at a time according to the scaling timing control signal, and referring to a scaling factor to scale up the source image to generate an upscaled image having M lines of pixel data, wherein M is a positive integer greater than N;
an output circuit, coupled to the scaling circuit, the output circuit arranged for outputting the M lines of pixel data of the upscaled image one at a time according to an output timing control signal; and
a timing control circuit, coupled to the output circuit, the scaling circuit and the image sensor array, the timing control circuit arranged for generating the output timing control signal according to an output timing, determining a receiving timing of the N lines of pixel data according to the output timing and the scaling factor and accordingly generating the scaling timing control signal, and determining a read timing of the N pixel lines according to the receiving timing and accordingly generating the read timing control signal;
wherein the output circuit outputs the M lines of pixel data during M output periods indicated by the output timing respectively; and during M receiving periods indicated by the receiving timing respectively corresponding to the M output periods, the scaling circuit selectively receives a line of pixel data during each of the M receiving periods according to the scaling timing control signal, so as to receive the N lines of pixel data during N of the M receiving periods respectively and not to receive the N lines of pixel data during (M-N) of the M receiving periods.

2. The image pickup apparatus of claim 1, wherein during M read periods indicated by the read timing respectively corresponding to the M receiving periods, the image sensor array selectively reads a pixel line during each of the M read periods according to the read timing control signal, so as to read the N pixel lines during N of the M read periods respectively and not to read the N pixel lines during (M-N) of the M read periods.

3. The image pickup apparatus of claim 2, wherein the timing control circuit further determines a reset timing of the plurality of pixel lines according to the receiving timing and accordingly generates a reset timing control signal; and during M reset periods indicated by the reset timing respectively corresponding to the M read periods, the image sensor array selectively resets one of the N pixel lines during each of the M reset periods according to the reset timing control signal, so as to reset the N pixel lines during N of the M reset periods respectively and reset (M-N) of the plurality of pixel lines different from the N pixel lines during (M-N) of the M reset periods respectively.

4. The image pickup apparatus of claim 3, wherein the image sensor array comprises an active pixel region arranged for photoelectric conversion, and each of the (M-N) pixel lines comprises at least one pixel located in the active pixel region.

5. The image pickup apparatus of claim 3, wherein the output circuit outputs the M lines of pixel data one at a time at a predetermined line rate according to the output timing control signal; and the image sensor array resets the N pixel lines and the (M-N) pixel lines one at a time at the predetermined line rate according to the rest timing control signal.

6. The image pickup apparatus of claim 2, wherein the output circuit outputs the M lines of pixel data one at a time at a predetermined line rate according to the output timing control signal; the plurality of pixel lines of the image sensor array comprises a plurality of dark pixel lines different from the N pixel lines; and during a plurality of read periods indicated by the read timing different from the M read periods, the image sensor array reads the dark pixel lines one at a time at the predetermined line rate according to the read timing control signal.

7. The image pickup apparatus of claim 2, wherein the output circuit outputs the M lines of pixel data one at a time at a predetermined line rate according to the output timing control signal; during P read periods indicated by the read timing different from the M read periods, the image sensor array reads P of the plurality of pixel lines adjacent to the N pixel lines one at a time at the predetermined line rate according to the read timing control signal; and P is a positive integer.

8. The image pickup apparatus of claim 1, wherein the output circuit outputs the M lines of pixel data one at a time at a predetermined line rate according to the output timing control signal; and the image sensor array operates at the predetermined line rate to access the plurality of pixel lines.

9. The image pickup apparatus of claim 8, wherein the timing control circuit further determines a reset timing of the plurality of pixel lines according to the receiving timing and accordingly generates a reset timing control signal; and the image sensor array resets the N pixel lines and (M-N) of the plurality of pixel lines different from the N pixel lines one at a time at the predetermined line rate according to the reset timing control signal.

10. The image pickup apparatus of claim 9, wherein the image sensor array comprises an active pixel region arranged for photoelectric conversion, and each of the (M–N) pixel lines comprises at least one pixel located in the active pixel region.

11. The image pickup apparatus of claim 8, wherein the plurality of pixel lines of the image sensor array comprises a plurality of dark pixel lines different from the N pixel lines, and the image sensor array further reads the dark pixel lines one at a time at the predetermined line rate according to the read timing control signal.

12. The image pickup apparatus of claim 8, wherein the image sensor array further reads P of the plurality of pixel lines adjacent to the N pixel lines one at a time at the predetermined line rate according to the read timing control signal, and P is a positive integer.

13. The image pickup apparatus of claim 1, wherein the timing control circuit comprises:
a first processing circuit, for receiving an input value during a receiving period, summing the input value and the scaling factor to generate a sum result, and comparing the sum result with a predetermined value to generate the scaling timing control signal, wherein when the sum result is greater than or equal to the predetermined value, the scaling circuit refers to the scaling timing control signal to receive one of the N lines of pixel data; and when the sum result is less than the predetermined value, the scaling circuit refers to the scaling timing control signal not to receive any line of pixel data;
a delay circuit, coupled to the first processing circuit, the delay circuit arranged for receiving an intermediate value during the receiving period, and outputting the intermediate value as the input value during another receiving period next to the receiving period; and
a second processing circuit, coupled between the first processing circuit and the delay circuit, the second processing circuit arranged for providing the intermediate value, wherein when the sum result is greater than or equal to the predetermined value, the second processing circuit subtracts the predetermined value from the sum result to generate a subtraction result, and uses the subtraction result as the intermediate value; and when the sum result is less than the predetermined value, the second processing circuit uses the sum result as the intermediate value.

14. The image pickup apparatus of claim 1, wherein the timing control circuit comprises:
an output timing generator, coupled to the output circuit, the output timing generator arranged for generating the output timing control signal according to the output timing;
a scaling timing generator, coupled to the output timing generator and the scaling circuit, the scaling timing generator arranged for determining the receiving timing according to the output timing and the scaling factor and accordingly generating the scaling timing control signal; and
a sensor timing generator, coupled to the scaling timing generator and the image sensor array, the sensor timing generator arranged for determining the read timing according to the receiving timing and accordingly generating the read timing control signal.

15. An image pickup method for image upscaling, comprising:
referring to an output timing and a scaling factor between a source image and an upscaled image to determine a receiving timing of N lines of pixel data of the source image received utilizing a scaling circuit, wherein the upscaled image comprises M lines of pixel data, the M lines of pixel data are outputted one at a time according to the output timing, N is a positive integer, and M is a positive integer greater than N;
determining a read timing of N pixel lines of a plurality of pixel lines of an image sensor array according to the receiving timing;
generating a read timing control signal according to the read timing, and reading the N pixel lines one at a time according to the read timing control signal so as to capture the N lines of pixel data; and
generating a scaling timing control signal according to the receiving timing, utilizing the scaling circuit to refer to the scaling timing control signal to receive the N lines of pixel data one at a time, and scaling up the N lines of pixel data to the M lines of pixel data according to the scaling factor;
wherein the M lines of pixel data are outputted during M output periods indicated by the output timing respectively; and the step of referring to the scaling timing control signal to receive the N lines of pixel data one at a time comprises:
during M receiving periods indicated by the receiving timing respectively corresponding to the M output periods, selectively receiving a line of pixel data during each of the M receiving periods according to the scaling timing control signal, so as to receive the N lines of pixel data during N of the M receiving periods respectively and not to receive the N lines of pixel data during (M–N) of the M receiving periods.

16. The image pickup method of claim 15, wherein the step of reading the N pixel lines one at a time according to the read timing control signal so as to capture the N lines of pixel data comprises:
during M read periods indicated by the read timing respectively corresponding to the M receiving periods, selectively reading a pixel line during each of the M read periods according to the read timing control signal, so as to read the N pixel lines during N of the M read periods respectively and not to read the N pixel lines during (M–N) of the M read periods.

17. The image pickup method of claim 16, further comprising: determining a reset timing of the plurality of pixel lines according to the receiving timing, and accordingly generating a reset timing control signal; and during M reset periods indicated by the reset timing respectively corresponding to the M read periods, selectively resetting one of the N pixel lines during each of the M reset periods according to the reset timing control signal, so as to reset the N pixel lines during N of the M reset periods respectively and reset (M–N) of the plurality of pixel lines different from the N pixel lines during (M–N) of the M reset periods respectively.

18. The image pickup method of claim 15, wherein the M lines of pixel data are outputted one at a time at a predetermined line rate, and the image sensor array operates at the predetermined line rate to access the plurality of pixel lines.

* * * * *